United States Patent
Dey et al.

(10) Patent No.: US 10,698,607 B2
(45) Date of Patent: Jun. 30, 2020

(54) CONFIGURATION UPDATE MANAGEMENT

(71) Applicant: NetApp Inc., Sunnyvale, CA (US)

(72) Inventors: Chinmoy Dey, West Bengal (IN);
Anoop Chakkalakkal Vijayan, Bangalore (IN); Prasad Srinivas, Bangalore (IN)

(73) Assignee: NETAPP INC., Sunnyvale, CA (US)

( * ) Notice: Subject to any disclaimer, the term of this patent is extended or adjusted under 35 U.S.C. 154(b) by 183 days.

(21) Appl. No.: 14/715,745

(22) Filed: May 19, 2015

(65) Prior Publication Data

US 2016/0342335 A1    Nov. 24, 2016

(51) Int. Cl.
*G06F 3/06*    (2006.01)
*G06F 9/455*   (2018.01)

(52) U.S. Cl.
CPC ............ *G06F 3/0607* (2013.01); *G06F 3/065* (2013.01); *G06F 3/067* (2013.01); *G06F 3/0619* (2013.01); *G06F 3/0665* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 5,555,409 A * | 9/1996 | Leenstra, Sr. | ..... | G06F 17/30958 |
| 5,890,154 A * | 3/1999 | Hsiao | ...................... | G06F 17/30 |
| 6,542,883 B1 * | 4/2003 | Salo | .................. | G06F 17/30483 |
| 6,615,219 B1 * | 9/2003 | Bruso | ............... | G06F 17/30067 |
| | | | | 707/699 |
| 7,469,256 B1 * | 12/2008 | Manolov | ........... | G06F 17/30377 |
| 7,587,433 B2 * | 9/2009 | Peleg | ........................ | G06F 8/62 |
| 7,653,651 B1 * | 1/2010 | Pavlov | .............. | G06F 17/30362 |
| | | | | 707/999.103 |
| 8,200,614 B2 * | 6/2012 | Syed | .................. | G06F 17/30442 |
| | | | | 707/602 |
| 8,688,634 B2 * | 4/2014 | Beyer | ............... | G06F 17/30286 |
| | | | | 707/616 |
| 8,769,102 B1 * | 7/2014 | Zhou | ................... | G06F 11/3696 |
| | | | | 709/223 |

(Continued)

*Primary Examiner* — Sean D Rossiter
*Assistant Examiner* — Stephanie Wu
(74) *Attorney, Agent, or Firm* — Pepper Hamilton LLP

(57) ABSTRACT

One or more techniques and/or systems are provided for managing configuration updates used to replicate configuration of a primary storage virtual machine to a partner storage virtual machine. For example, the partner storage virtual machine may be configured to provide failover operation in place of the primary storage virtual machine in the event the primary storage virtual machine fails. Configuration updates are queued and replayed on the partner storage virtual machine to replicate objects of the primary storage virtual machine to the partner storage virtual machine (e.g., replay of create, modify, or delete object commands for synchronizing volumes, logical unit numbers, and/or other configuration objects of the primary storage virtual machine to the partner storage virtual machine). Configuration updates may be retained, modified, or discarded/removed based upon consolidation rules, which improves computing resource utilization by consolidating configuration updates and/or removing stale configuration updates while achieving a similar replication consistency result.

17 Claims, 15 Drawing Sheets

(56) References Cited

U.S. PATENT DOCUMENTS

| | | | |
|---|---|---|---|
| 9,432,298 B1* | 8/2016 | Smith | H04L 49/9057 |
| 2002/0126541 A1* | 9/2002 | Spiegel | G06F 9/546 |
| | | | 365/189.07 |
| 2003/0144990 A1* | 7/2003 | Benelisha | G06F 17/30191 |
| 2006/0288046 A1* | 12/2006 | Gupta | G06F 17/30592 |
| 2007/0088926 A1* | 4/2007 | Fields, Jr. | G06F 12/0815 |
| | | | 711/163 |
| 2007/0204265 A1* | 8/2007 | Oshins | G06F 9/4856 |
| | | | 718/1 |
| 2009/0070524 A1* | 3/2009 | Wood | G06F 12/0815 |
| | | | 711/105 |
| 2009/0077135 A1* | 3/2009 | Yalamanchi | G06F 17/30359 |
| 2010/0011147 A1* | 1/2010 | Hummel | G06F 9/45558 |
| | | | 711/6 |
| 2010/0262721 A1* | 10/2010 | Asnaashari | G06F 13/161 |
| | | | 710/5 |
| 2011/0145499 A1* | 6/2011 | Ananthanarayanan | |
| | | | G06F 12/0866 |
| | | | 711/118 |
| 2012/0084484 A1* | 4/2012 | Post | G06F 3/061 |
| | | | 710/308 |
| 2012/0131589 A1* | 5/2012 | Golab | G06F 9/5027 |
| | | | 718/104 |
| 2012/0159498 A1* | 6/2012 | Wilmarth | G06F 9/526 |
| | | | 718/103 |
| 2013/0205183 A1* | 8/2013 | Fillingim | G06F 11/1044 |
| | | | 714/773 |
| 2014/0095449 A1* | 4/2014 | Marwah | G06F 3/0649 |
| | | | 707/668 |
| 2014/0245326 A1* | 8/2014 | Kruglick | G06F 9/546 |
| | | | 719/314 |
| 2015/0026115 A1* | 1/2015 | Gorelik | G06F 17/30 |
| | | | 707/602 |
| 2015/0106802 A1* | 4/2015 | Ivanov | G06F 9/45558 |
| | | | 718/1 |
| 2015/0212941 A1* | 7/2015 | Dinkjian | G06F 12/00 |
| | | | 711/133 |
| 2016/0092463 A1* | 3/2016 | Vijayan | G06F 17/302 |
| | | | 707/626 |
| 2016/0283331 A1* | 9/2016 | Barber | G06F 9/466 |
| 2016/0342335 A1* | 11/2016 | Dey | G06F 3/0607 |
| 2016/0378675 A1* | 12/2016 | Giuliani | G06F 12/1009 |
| | | | 711/206 |

* cited by examiner

CONFIGURATION UPDATE MANAGEMENT

BACKGROUND

A cluster storage environment may comprise one or more storage clusters. A storage cluster may comprise one or more nodes. A node may be configured to provide client devices with access to user data stored on storage devices. Nodes may be configured according to various policies, such as a high availability policy where two nodes are paired together such that a primary node actively services client I/O requests and a partner node passively waits to provide failover recovery operation on behalf of the primary node in the event the primary node experiences a failure. Various issues, such as an inability for clients to access user data, may arise when information is not reliably replicated between nodes and/or storage clusters, when cluster-wide outages are not detected, and/or when failover operation is not implemented in an efficient manner.

In an example, a primary node, within a first storage cluster, may host a primary storage virtual machine within which objects, such as volumes, LUNs, data objects, and/or other configuration objects (e.g., a size of a volume, data access functionality, network access functionality, etc.) may be stored. A secondary node, within a second storage cluster, may host a partner storage virtual machine within which configuration of the partner storage virtual machine may be replicated (e.g., a creation of a LUN, a deletion of a volume, a resizing of a volume, and/or other changes to objects at the primary storage virtual machine may be replicated to the partner storage virtual machine). A logical stream may be created between the primary storage virtual machine and the partner storage virtual machine. Changes to objects of the primary storage virtual machine may be transferred over the logical stream to the partner storage virtual machine as configuration updates. If an asynchronous replication mode is used, configuration updates may be queued into a queue. Queued configuration updates may be read from the queue and applied to the partner storage virtual machine based upon recovery point objectives (RPO) set by a user.

Unfortunately, substantial amounts of network bandwidth, processing resources, database transactions, CPU usage, and/or other computing resource usage may be needlessly wasted on redundant, stale, and/or irrelevant configuration updates. In an example, a create volume configuration update for a volume (A) and a subsequent delete volume configuration update for the volume (A) may be queued, and thus resources used to perform the create volume configuration update may be wasted because the volume (A) will be subsequently deleted by the delete volume configuration update. In another example, a create volume configuration update for a volume (B) and a subsequent modify volume configuration update to increase the size of the volume (B) from 1 GB to 2 GB may be queued, and thus resources may be wasted to perform 2 separate configuration updates for a result that could otherwise be achieved by a single modified create volume configuration update to create the volume (B) at 2 GB as opposed to 1 GB.

DETAILED DESCRIPTION

Figure 1:
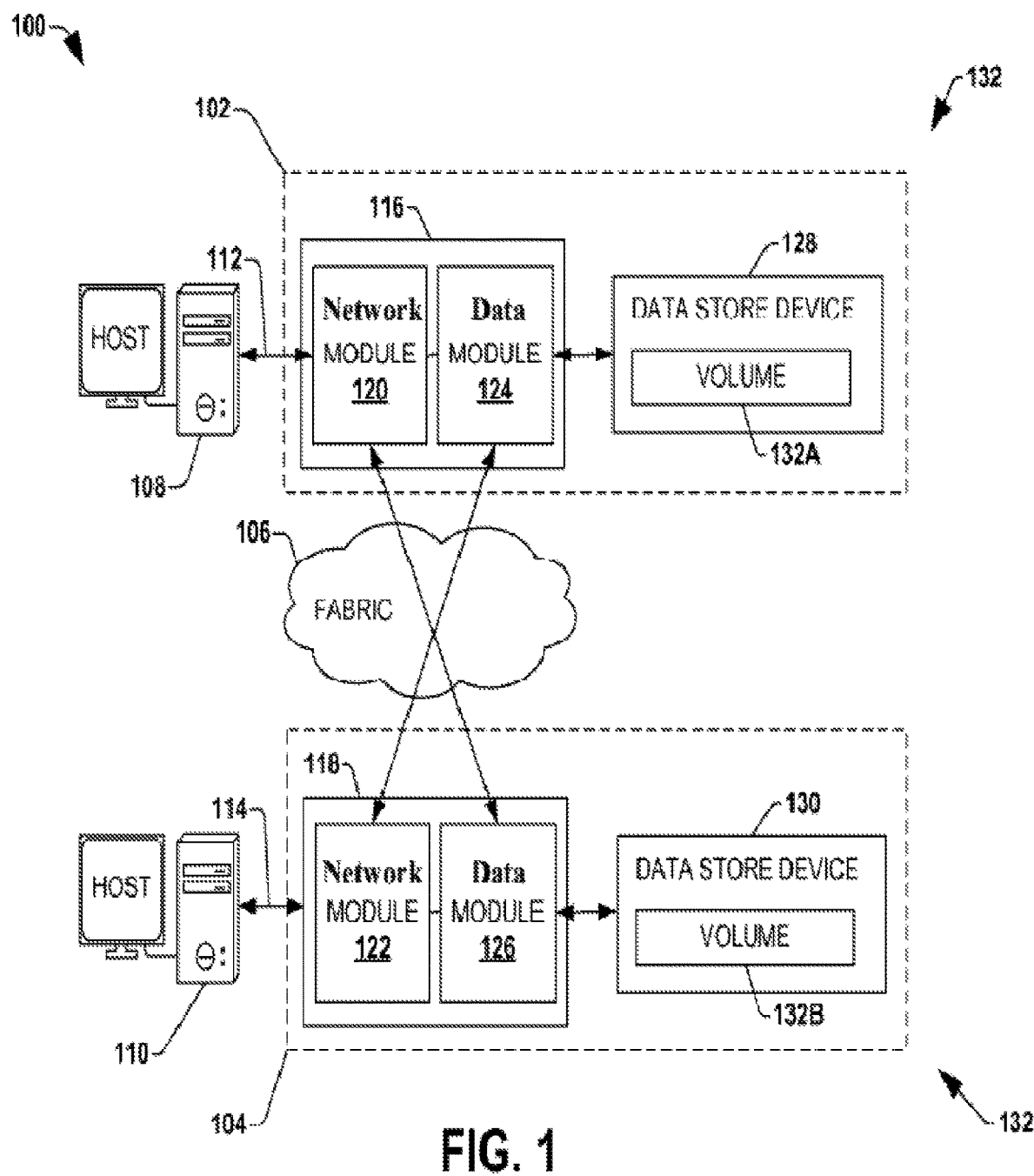
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for managing configuration updates used to replicate configuration of a primary storage virtual machine to a partner storage virtual machine are provided. Changes to objects of the partner storage virtual machine (e.g., creation, modification, and/or deletion of a volume, a logical unit number (LUN), a storage object, a data access configuration, a network access configuration, a configuration object, etc.) may be replicated to the partner storage virtual machine using configuration updates so that the partner storage virtual machine may provide failover operation using up-to-date user data and/or configuration data in the event the primary storage virtual machine fails. As provided herein, configuration updates may be managed in an efficient manner in order to reduce unnecessary CPU usage, network bandwidth, memory usage, databased calls, and/or other resource usage that would otherwise be wasted in implementing unnecessary and/or stale configuration updates. For example, configuration updates may be consolidated (e.g., a creation size of a volume creation configuration update may be modified to match a new size specified by a subsequent modify configuration update that will modify the size of the volume to the new size, and thus the subsequent modify configuration update may be discarded) and/or stale configuration updates (e.g., a modify configuration update for a volume may be removed if a subsequent configuration update will delete the volume) may be removed from a queue of configuration updates.

To provide context for managing configuration updates, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and/or data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that managing configuration updates, such as a replication component (e.g. hosted on host devices 108, 110, data storage systems 102, 104, nodes 116, 118, or within any other computing device), may be implemented within the clustered network environment 100. For example, the replication component may manage configuration updates used to replicate configuration and/or objects from a primary storage virtual machine hosted by the node 116 to a partner storage virtual machine hosted by the node 118.

Figure 2:
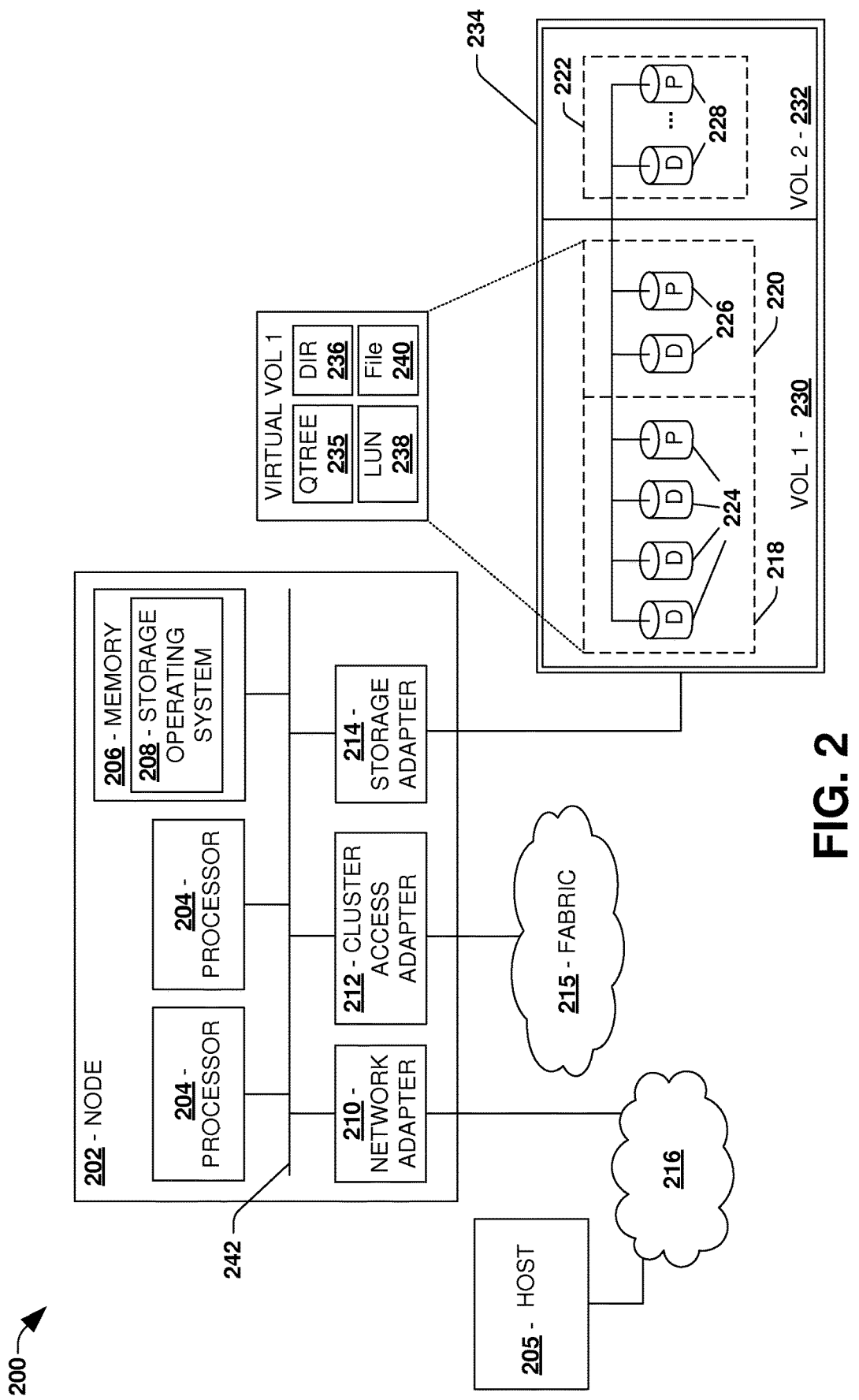
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that managing configuration updates, such as a replication component (e.g. hosted on host device 205, node 202, or within any other computing device), may be implemented for the data storage system 200. For example, the replication component may manage configuration updates used to replicate configuration and/or objects from a primary storage virtual machine to a partner storage virtual machine hosted by the node 202.

Figure 3:
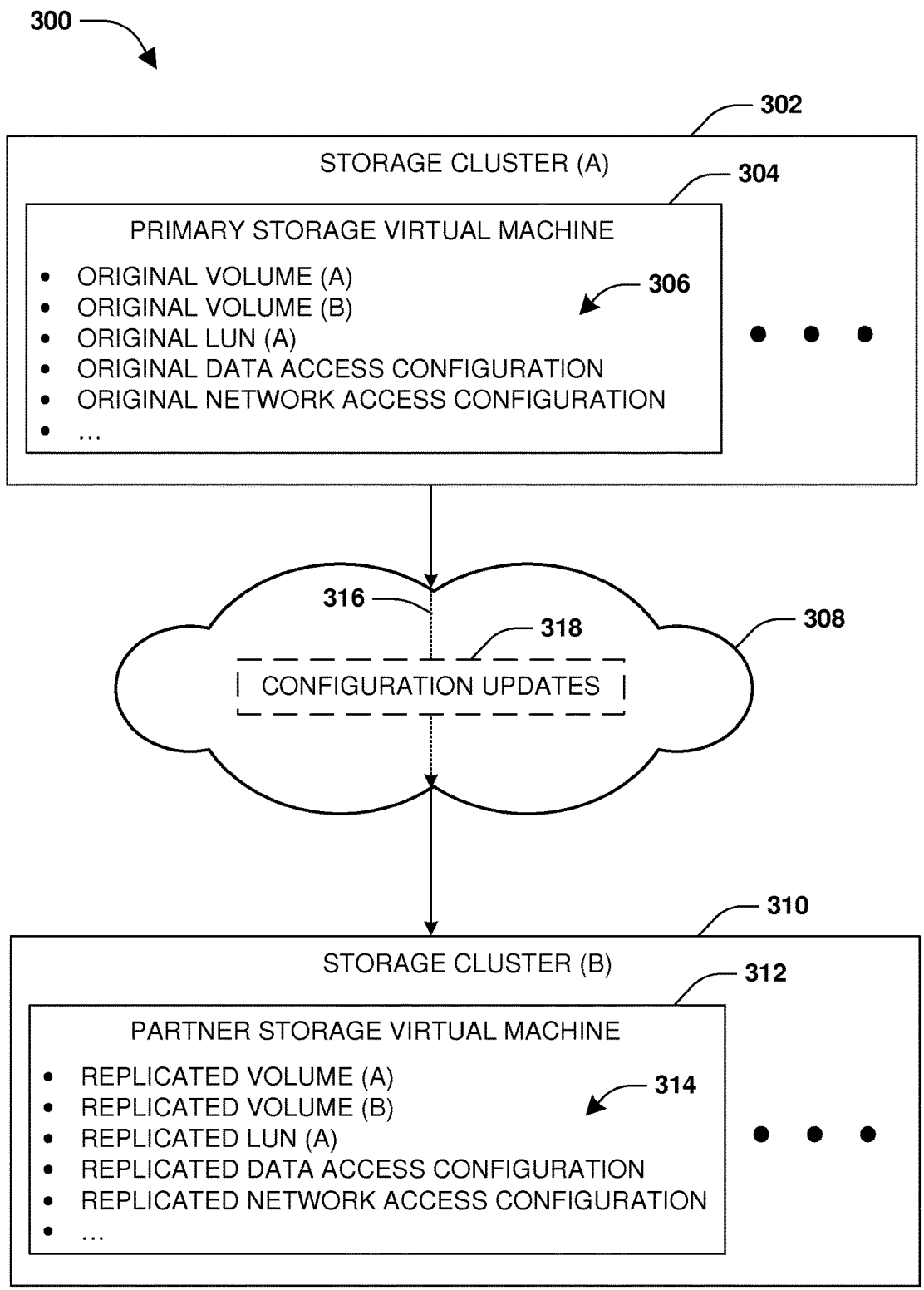
FIG. 3 is a component block diagram illustrating an exemplary system for replicating configuration of a primary storage virtual machine to a partner storage virtual machine.

FIG. 3 illustrates an example of a system 300 for replicating objects from a primary storage virtual machine 304 to a partner storage virtual machine 312. A storage cluster (A) 302 may comprise one or more nodes configured to provide clients with access to data stored within data storage devices. The one or more nodes may host the primary storage virtual machine 304. The primary storage virtual machine 304 may comprise one or more objects 306, such as an original volume (A), an original volume (B), an original LUN (A), original data access configuration (e.g., polices and/or rules on how to provide clients with access to data), original network access configuration, and/or other objects and configuration data.

A storage cluster (B) 310 may comprise one or more nodes that may provide failover operation in the event the storage cluster (A) 302 fails. User data and/or configuration data may be replicated from the storage cluster (A) 302 to the storage cluster (B) 310 so that the storage cluster (B) 310 may have up-to-date replicated configuration data used to provide clients with access to user data in the event storage cluster (A) 302 fails. For example, the one or more nodes of the storage cluster (B) 310 may host the partner storage virtual machine 312 that is configured to provide disaster recovery and failover operation for the primary storage virtual machine 304.

Changes to the primary storage virtual machine 304 may be sent from the primary storage virtual machine 304, over a logical stream 316 (e.g., over a network 308 connecting the storage cluster (A) 302 to the storage cluster (B) 310), to the storage cluster (B) 310 as configuration updates 318. The configuration updates 318 may be queued into a queue (e.g., a create queue, a modify queue, a delete queue, etc.), and may be de-queued and replayed on the partner storage virtual machine 312 to create replicated objects 314 that are replications of the one or more objects 306 of the primary storage virtual machine 304, such as a replicated volume (A), replicated volume (B), a replicated LUN (A), replicated data access configuration, replicated network access configuration, etc. The configuration updates 318 may correspond to creation, modification, and/or deletion of objects. As provided herein, the configuration updates 318 may be efficiently managed by consolidating configuration updates and/or removing stale configuration updates from the queue.

Figure 4:
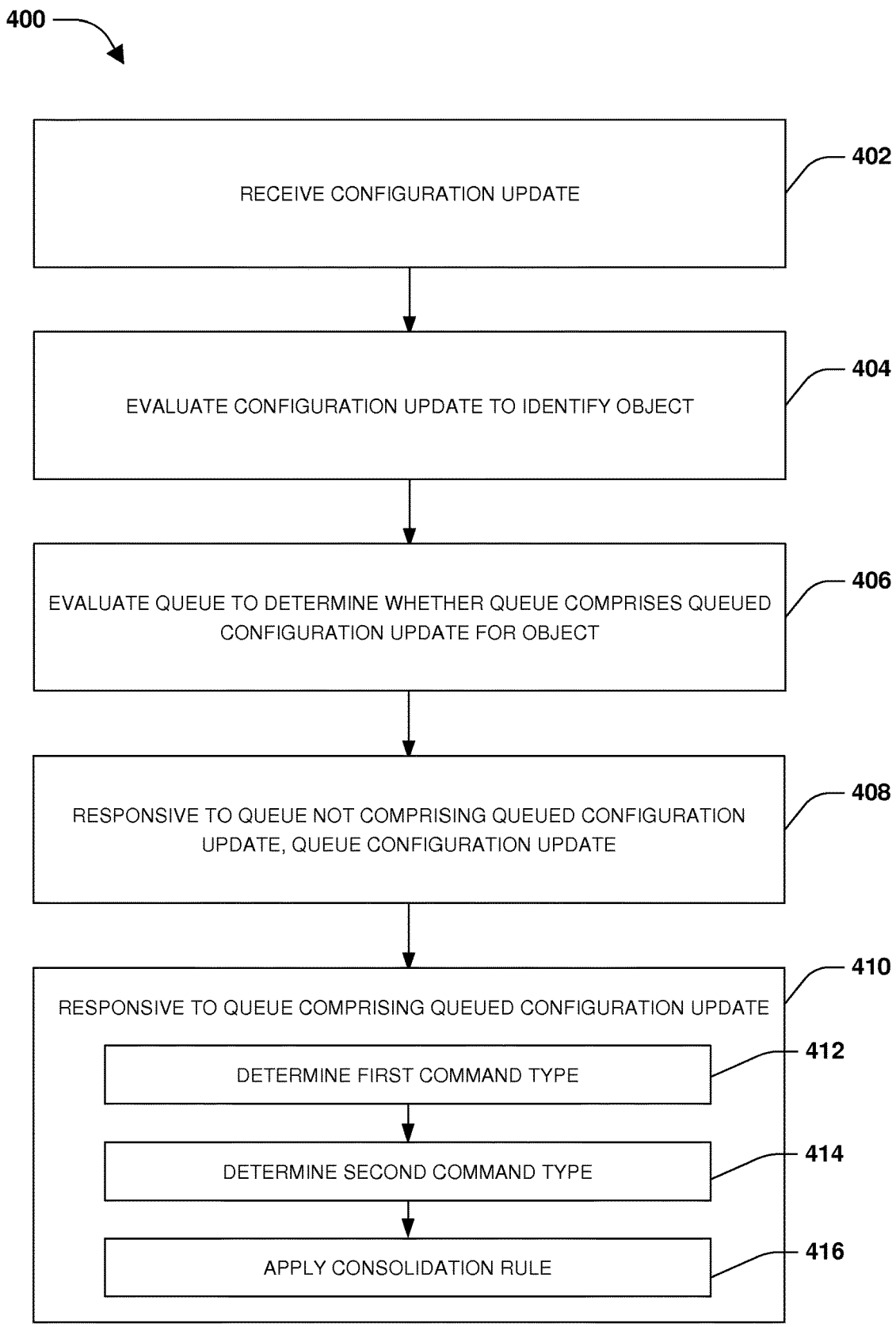
FIG. 4 is a flow chart illustrating an exemplary method of managing configuration updates used to replicate configuration of a primary storage virtual machine to a partner storage virtual machine.

One embodiment of managing configuration updates used to replicate configuration of a primary storage virtual machine to a partner storage virtual machine is illustrated by an exemplary method 400 of FIG. 4. A logical stream or any other communication connection may be established between the primary storage virtual machine (e.g., a primary storage node of a storage cluster (A)) and the partner storage virtual machine (e.g., a partner storage node of a storage cluster (B)) so that the creation, modification, and/or deletion of objects (e.g., a LUN, a volume, a data access configuration, a network access configuration, a storage object, a configuration object, or any other object that may be replicated between a source and a destination) at the primary storage virtual machine may be replicated to the partner storage virtual machine. In this way, the partner storage virtual machine may reflect a relatively up-to-date replication of the primary storage virtual machine so that the partner storage virtual machine may provider disaster recovery and/or failover operation for the primary storage virtual machine.

At 402, a configuration update, to be applied to the partner storage virtual machine, may be received from the primary storage virtual machine (e.g., a change to an object of the primary storage virtual machine). The configuration update may correspond to a create object command to create a new object, a modify object command to modify an existing object, or a delete object command to delete an object within the partner storage virtual machine, which may reflect the change to the object of the primary storage virtual machine. At 404, the configuration update may be evaluated to identify an object to which the configuration update is to be applied. For example, key fields may be extracted from the configuration update to identify the object (e.g., a name of a volume), a requested object command (e.g., a delete command), and/or attributes (e.g., a volume name, a storage virtual machine name, etc.).

One or more queues may be maintained for configuration updates. In an example, a create queue, into which one or more configuration updates corresponding to a create object command type are to be queued, may be maintained. A modify queue, into which one or more configuration updates corresponding to a modify object command type are to be queued, may be maintained. A delete queue, into which one or more configuration updates corresponding to a delete object command type are to be queued, may be maintained. At 406, one or more queues of configuration updates may be evaluated to determine whether a queue comprises a queue configuration update for the object. In an example, the create queue, the modify queue, and/or the delete queue may be evaluated. A queue evaluation order, specifying that the create queue is to be evaluate for object identification before the modify queue and the delete queue and that the modify queue is to be evaluated for object identification before the delete queue, may be defined and/or utilized when evaluating queues for potential identification of the queued configuration update corresponding to the object.

At 408, responsive to the one or more queues not comprising the queued configuration update, the configuration update may be queued into a queue (e.g., a create volume configuration update may be queued into the create queue).

At 410, a queue may be determined as comprising the queued configuration update for the object. Accordingly, a first command type of the queued configuration update may be determined (e.g., a create object command type, a modify object command type, or a delete object command type), at

412. A second command type of the configuration update may be determined (e.g., the create object command type, the modify object command type, or the delete object command type), at 414. At 416, a consolidation rule (e.g., a removal rule, a discard rule, a modify/combine rule, etc.), corresponding to the first command type and the second command type, may be applied to the configuration update and the queued configuration update.

In an example of applying the consolidation rule, the first command type may comprise a create object command (e.g., the queued configuration update may correspond to a create volume (A) command) and the second command type may comprise a modify object command (e.g., the configuration update may modify volume (A) from 1 GB to 2 GB). The consolidation rule may specify that the queued configuration update to create volume (A) is to be modified based upon an attribute, such as a 2 GB new size attribute, of the configuration update to create a modified queued configuration update for queueing into the modify queue. In this way, the modified queued configuration update may be executed as a single command to create the volume (A) at 2 GB, as opposed to wasting resources to implement two separate configuration updates.

In another example of applying the consolidation rule, the first command type may comprise a create object command (e.g., the queued configuration update may correspond to a create volume (A) command) and the second command type may comprise a delete object command (e.g., the configuration update may correspond to a delete volume (A) command). The consolidation rule may specify that the queued configuration update is to be removed from the create queue and that the configuration update is to be discarded. In this way, the non-existence of volume (A) may be achieved without implementing configuration updates, as opposed to wasting resources to implement two separate configuration updates to create and then delete volume (A).

In another example of applying the consolidation rule, the first command type may comprise a modify object command (e.g., the queued configuration update may correspond to a name modification command for a volume (A)) and the second command type may comprise a delete object command (e.g., the configuration update may correspond to a delete volume (A) command). The consolidation rule may specify that the queued configuration update is to be removed from the modify queue and that the configuration update is to be queued into the delete queue. In this way, the name modification command may be removed because the name modification command may be stale since the volume (A) will be subsequently deleted.

In another example of applying the consolidation rule, the first command type may comprise a delete object command (e.g., the queued configuration update may correspond to a delete volume (A) command) and the second command type may comprise a create object command (e.g., the configuration update may correspond to a create volume (A) command). The consolidation rule may specify that the queued configuration update is to be removed from the delete queue, that the configuration update is to be discarded, and that a new configuration update, corresponding to a modify object command having an attribute of the configuration update, is to be queued in the modify queue (e.g., the new configuration update may specify that an existing volume (A) is to be renamed to a name attribute of the create volume (A) command).

In an example, object commands, specified by queued configuration updates within the one or more queues, may be applied for objects on the partner storage virtual machine in order to synchronize the partner storage virtual machine with the primary storage virtual machine (e.g., so that the partner storage virtual machine comprises replicated objects corresponding to original objects of the primary storage virtual machine). In an example, configuration updates within a queue may be sorted based upon a dependency list of dependencies between objects. For example, a volume (A) may depend upon a snapshot (A), and thus a first queued configuration update that creates the snapshot (A) at the partner storage virtual machine may be sorted to be performed before a queued second configuration update that creates the volume (A) at the partner storage virtual machine. In this way, queued configuration updates may be applied based upon the dependency list.

Figure 5A:
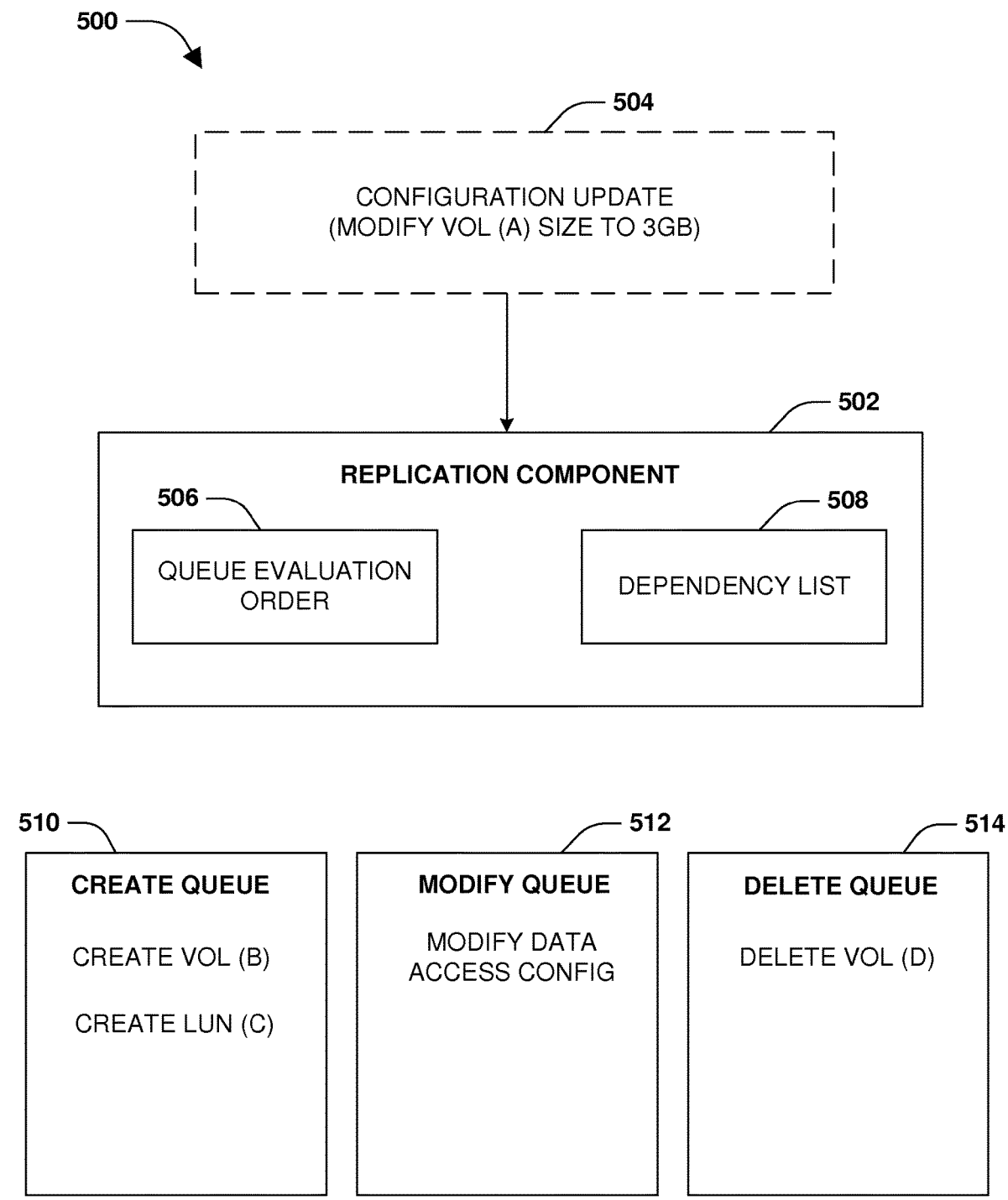
FIG. 5A is a component block diagram illustrating an exemplary system for managing configuration updates used to replicate configuration of a primary storage virtual machine to a partner storage virtual machine, where a configuration update, corresponding to a modify object command, is received.
Figure 5B:
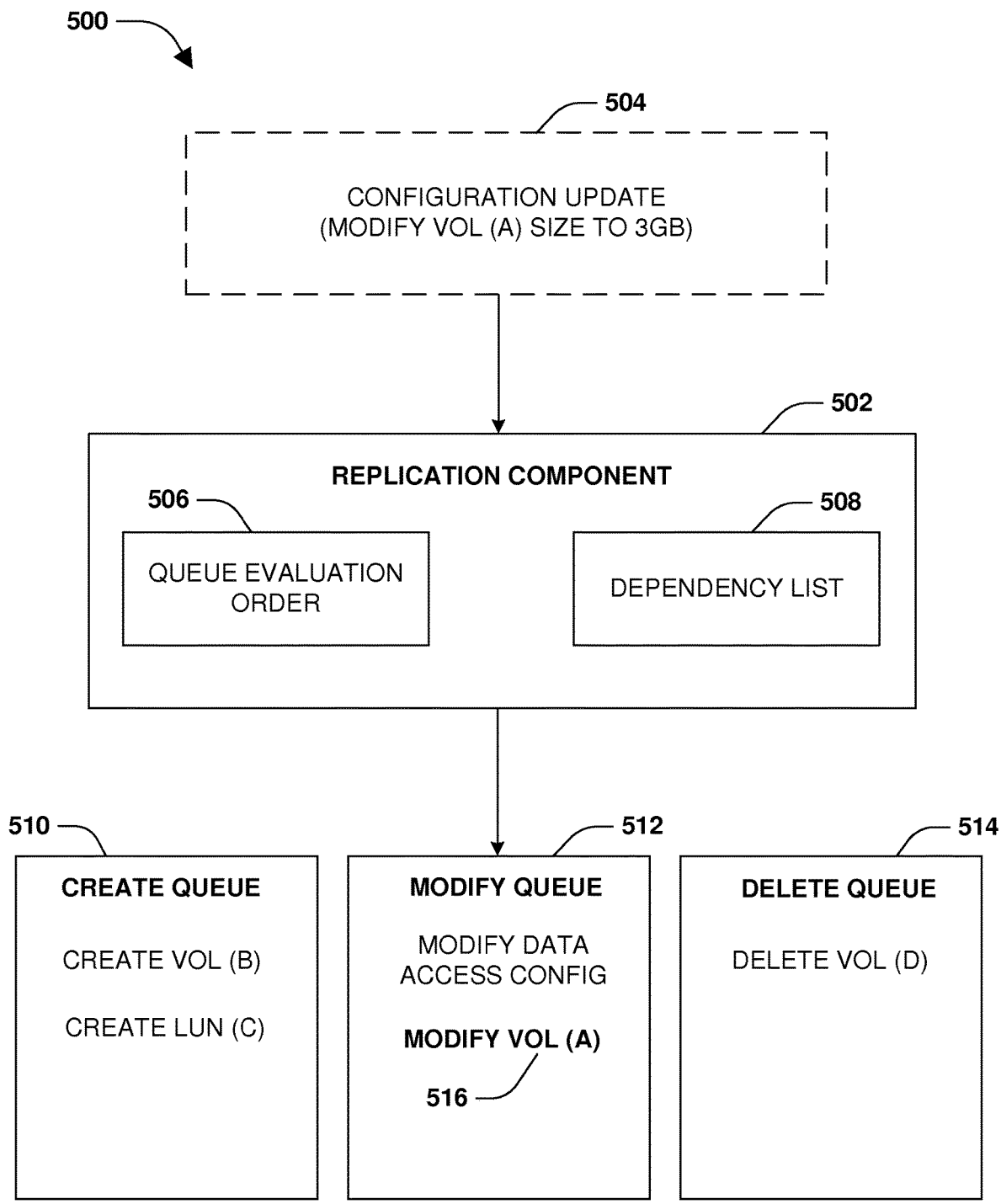
FIG. 5B is a component block diagram illustrating an exemplary system for managing configuration updates used to replicate configuration of a primary storage virtual machine to a partner storage virtual machine, where a configuration update is queued within a queue.

FIGS. 5A-5B illustrate examples of a system 500, comprising a replication component 502, for managing configuration updates used to replicate configuration of a primary storage virtual machine to a partner storage virtual machine. The replication component 502 may maintain a create queue 510, a modify queue 512, and a delete queue 514. In an example, a create volume (B) queued configuration update and a create LUN (C) queued configuration update may be queued within the create queue 510, a modify data access configuration queued configuration update may be queued within the modify queue 512, and a delete volume (D) queued configuration update may be queued within the delete queue 514. The replication component 502 may sort queued configuration updates within the queues based upon a dependency list 508 of dependencies between objects (e.g., a LUN (C) object may dependent upon a volume (B) object, and thus the create LUN (C) queued configuration update may be sorted after/behind the create volume (B) queued configuration update). The replication component 502 may maintain a queue evaluation order 506 specifying that the create queue 510 should be evaluated first, the modify queue 512 should be evaluated after the create queue 510, and the delete queue 514 should be evaluated after the modify queue 512 for object identification.

FIG. 5A illustrates the replication component 502 receiving a configuration update 504 from the primary storage virtual machine. The replication component 502 may evaluate the configuration update 504 to determine that the configuration update 504 corresponds to a modify object command used to set a size of a volume (A) object to 3 GB. The replication component 502 may evaluate the create queue 510, the modify queue 512, and/or the delete queue 514 (e.g., according to the queue evaluation order 506) to determine whether a queued configuration update, associated with the volume (A) object, exists within a queue. FIG. 5B illustrates the replication component 502 queueing the configuration update 504 into the modify queue 512 as a modify volume (A) queued configuration update 516 responsive to none of the queues comprising the queued configuration update associated with the volume (A) object.

Figure 6A:
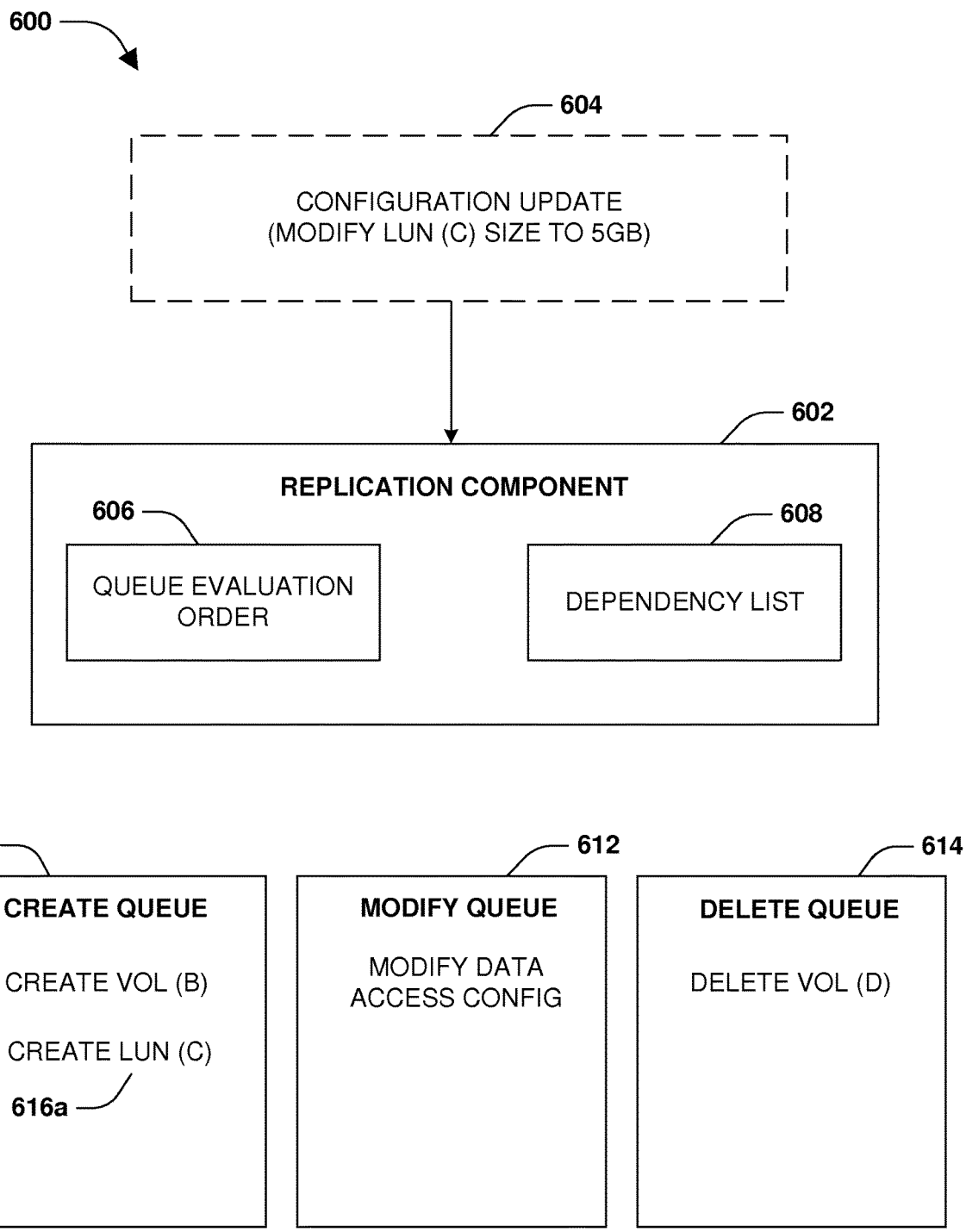
FIG. 6A is a component block diagram illustrating an exemplary system for managing configuration updates used to replicate configuration of a primary storage virtual machine to a partner storage virtual machine, where a configuration update, corresponding to a modify object command, is received.
Figure 6B:
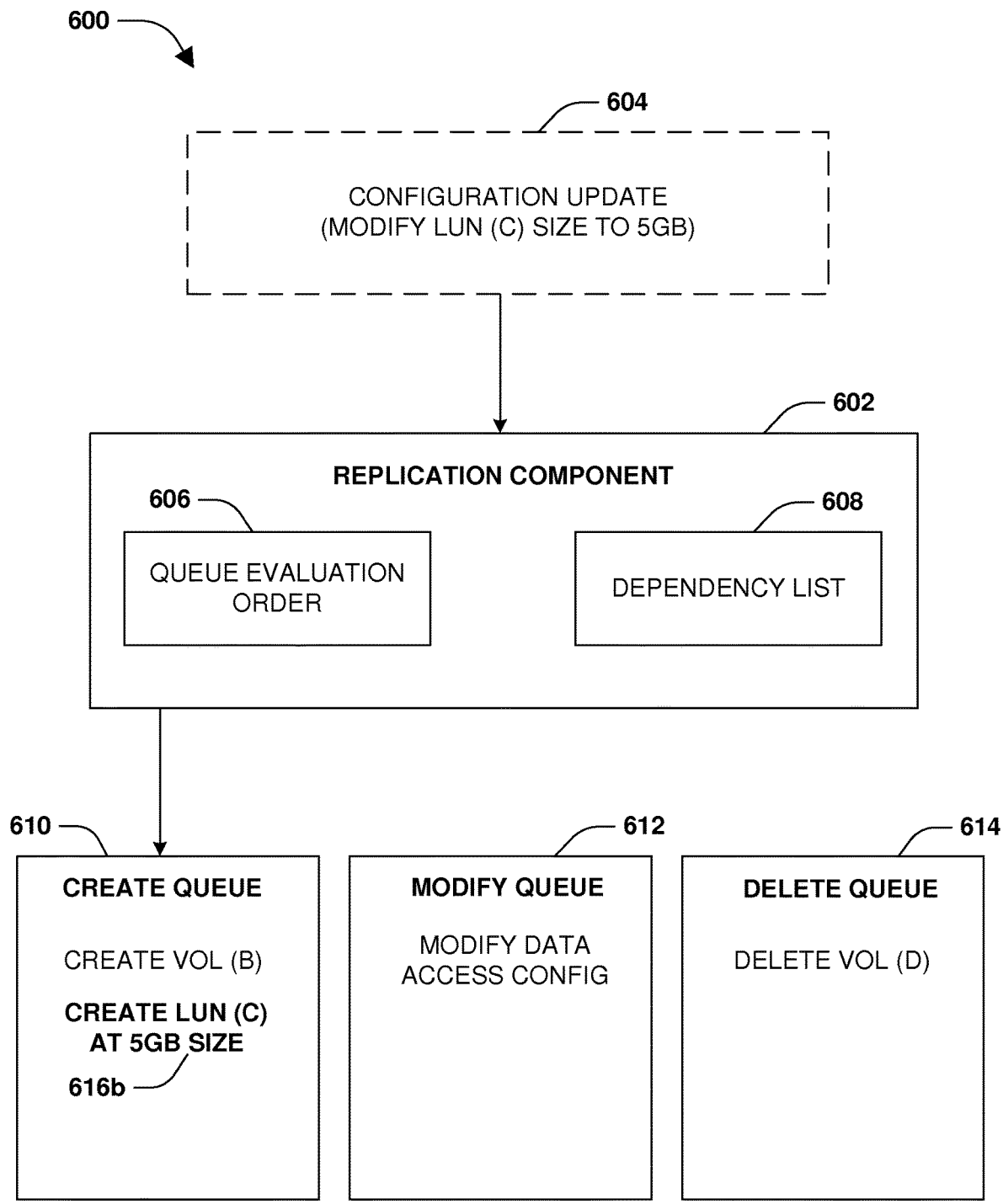
FIG. 6B is a component block diagram illustrating an exemplary system for managing configuration updates used to replicate configuration of a primary storage virtual machine to a partner storage virtual machine, where a consolidation rule is implemented.

FIGS. 6A-6B illustrate examples of a system 600, comprising a replication component 602, for managing configuration updates used to replicate configuration of a primary storage virtual machine to a partner storage virtual machine. The replication component 602 may maintain a create queue 610, a modify queue 612, and a delete queue 614. In an example, a create volume (B) queued configuration update and a create LUN (C) queued configuration update 616*a* (e.g., a command to create a LUN (C) object having a 3 GB size) may be queued within the create queue 610, a modify data access configuration queued configuration update may be queued within the modify queue 612, and a delete volume (D) queued configuration update may be queued within the delete queue 614. The replication component 602 may sort queued configuration updates within the queues based upon a dependency list 608 of dependencies between objects. The replication component 602 may maintain a queue evaluation order 606 specifying that the create queue 610 should be evaluated first, the modify queue 612 should be evaluated after the create queue 610, and the delete queue 614 should be evaluated after the modify queue 612 for object identification.

FIG. 6A illustrates the replication component 602 receiving a configuration update 604 from the primary storage virtual machine. The replication component 602 may evaluate the configuration update 604 to determine that the configuration update 604 corresponds to a modify object command used to set a size of a LUN (C) object to 5 GB (e.g., from the 3 GB size to the 5 GB size). The replication component 602 may evaluate the create queue 610, the modify queue 612, and/or the delete queue 614 (e.g., according to the queue evaluation order 606) to determine whether a queued configuration update, associated with the LUN (C) object, exists within a queue. For example, the replication component 602 may determine that the create LUN (C) queued configuration update 616a, within the create queue 610, corresponds to the LUN (C) object. FIG. 6B illustrates the replication component 602 implementing a consolidation rule based upon the create queue 610 comprising the create LUN (C) queued configuration update 616a corresponding to the LUN (C) object. The consolidation rule may specify that the create LUN (C) queued configuration update 616a is to be modified based upon an attribute of the configuration update 604 (e.g., the creation size of the LUN (C) object may be changed from the 3 GB size to the 5 GB size) to create a modified create LUN (C) queued configuration update 616b for queueing into the create queue 610. The consolidation rule may specify that the configuration update 604 is to be discarded, which may achieve a similar result using merely a single queued configuration update as if both the create LUN (C) queued configuration update 616a and the configuration update 604 were performed.

Figure 7A:
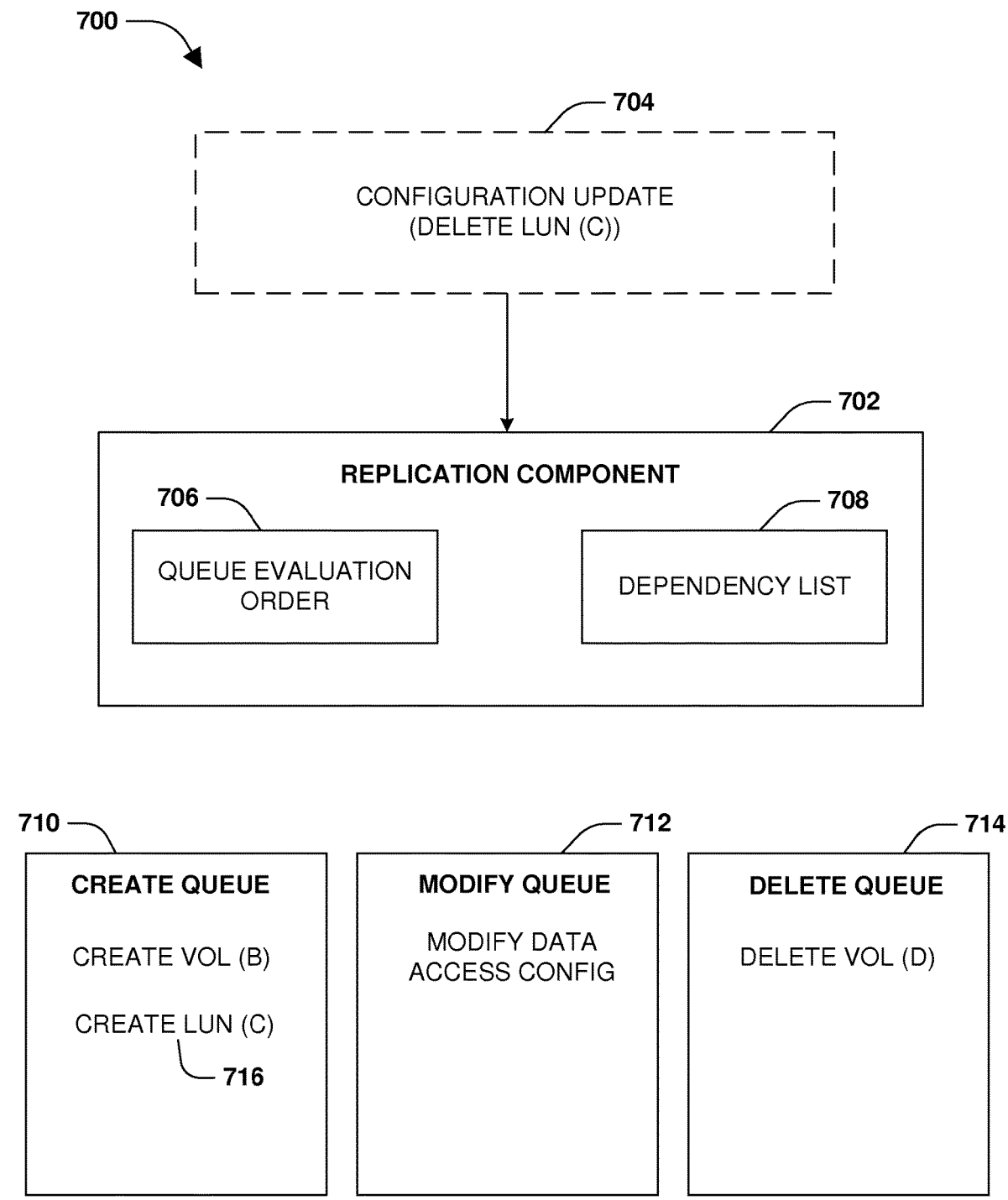
FIG. 7A is a component block diagram illustrating an exemplary system for managing configuration updates used to replicate configuration of a primary storage virtual machine to a partner storage virtual machine, where a configuration update, corresponding to a delete object command, is received.
Figure 7B:
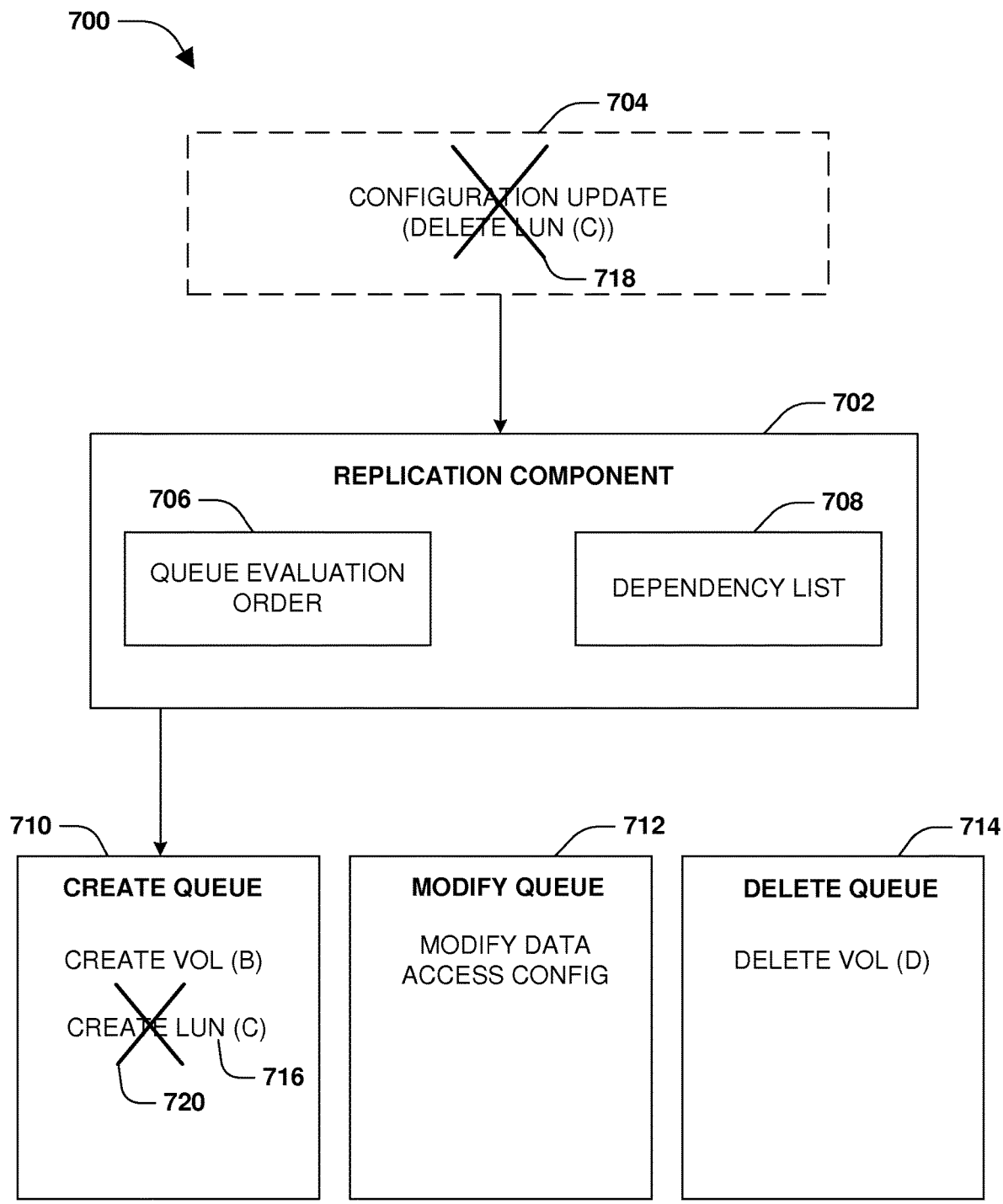
FIG. 7B is a component block diagram illustrating an exemplary system for managing configuration updates used to replicate configuration of a primary storage virtual machine to a partner storage virtual machine, where a consolidation rule is implemented.

FIGS. 7A-7B illustrate examples of a system 700, comprising a replication component 702, for managing configuration updates used to replicate configuration of a primary storage virtual machine to a partner storage virtual machine. The replication component 702 may maintain a create queue 710, a modify queue 712, and a delete queue 714. In an example, a create volume (B) queued configuration update and a create LUN (C) queued configuration update 716 (e.g., a command to create a LUN (C) object having a 3 GB size) may be queued within the create queue 710, a modify data access configuration queued configuration update may be queued within the modify queue 712, and a delete volume (D) queued configuration update may be queued within the delete queue 714. The replication component 702 may sort queued configuration updates within the queues based upon a dependency list 708 of dependencies between objects. The replication component 702 may maintain a queue evaluation order 706 specifying that the create queue 710 should be evaluated first, the modify queue 712 should be evaluated after the create queue 710, and the delete queue 714 should be evaluated after the modify queue 712 for object identification.

FIG. 7A illustrates the replication component 702 receiving a configuration update 704 from the primary storage virtual machine. The replication component 702 may evaluate the configuration update 704 to determine that the configuration update 704 corresponds to a delete object command used to delete a LUN (C) object. The replication component 702 may evaluate the create queue 710, the modify queue 712, and/or the delete queue 714 (e.g., according to the queue evaluation order 706) to determine whether a queued configuration update, associated with the LUN (C) object, exists within a queue. For example, the replication component 702 may determine that the create LUN (C) queued configuration update 716, within the create queue 710, corresponds to the LUN (C) object. FIG. 7B illustrates the replication component 702 implementing a consolidation rule based upon the create queue 710 comprising the create LUN (C) queued configuration update 716 corresponding to the LUN (C) object. The consolidation rule may specify that the create LUN (C) queued configuration update 716 is to be removed 720 from the create queue 710 and that the configuration update 704 is to be discarded 718, which may achieve a similar result as if both the create LUN (C) queued configuration update 716 and the configuration update 704 were performed.

Figure 8A:
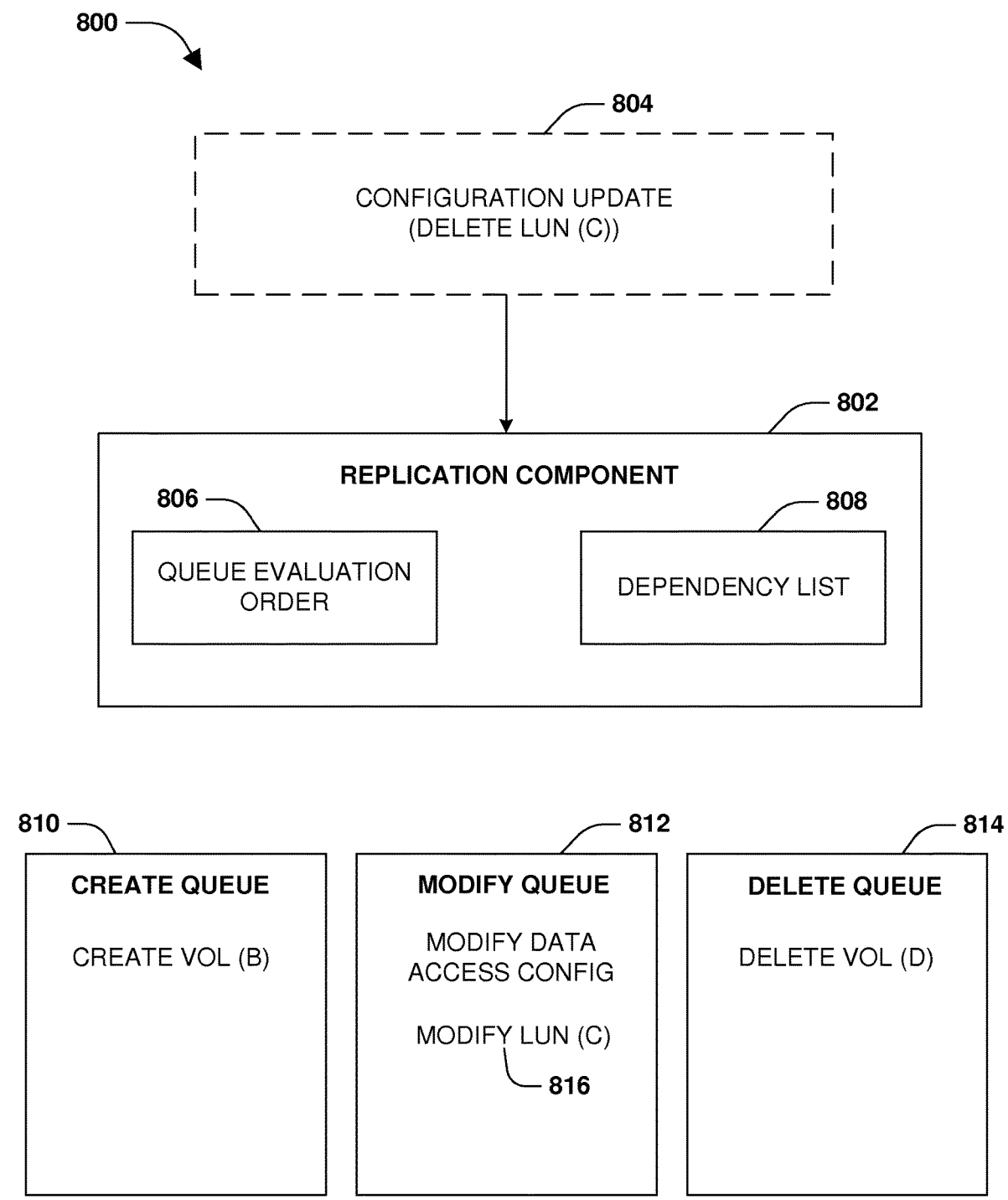
FIG. 8A is a component block diagram illustrating an exemplary system for managing configuration updates used to replicate configuration of a primary storage virtual machine to a partner storage virtual machine, where a configuration update, corresponding to a delete object command, is received.
Figure 8B:
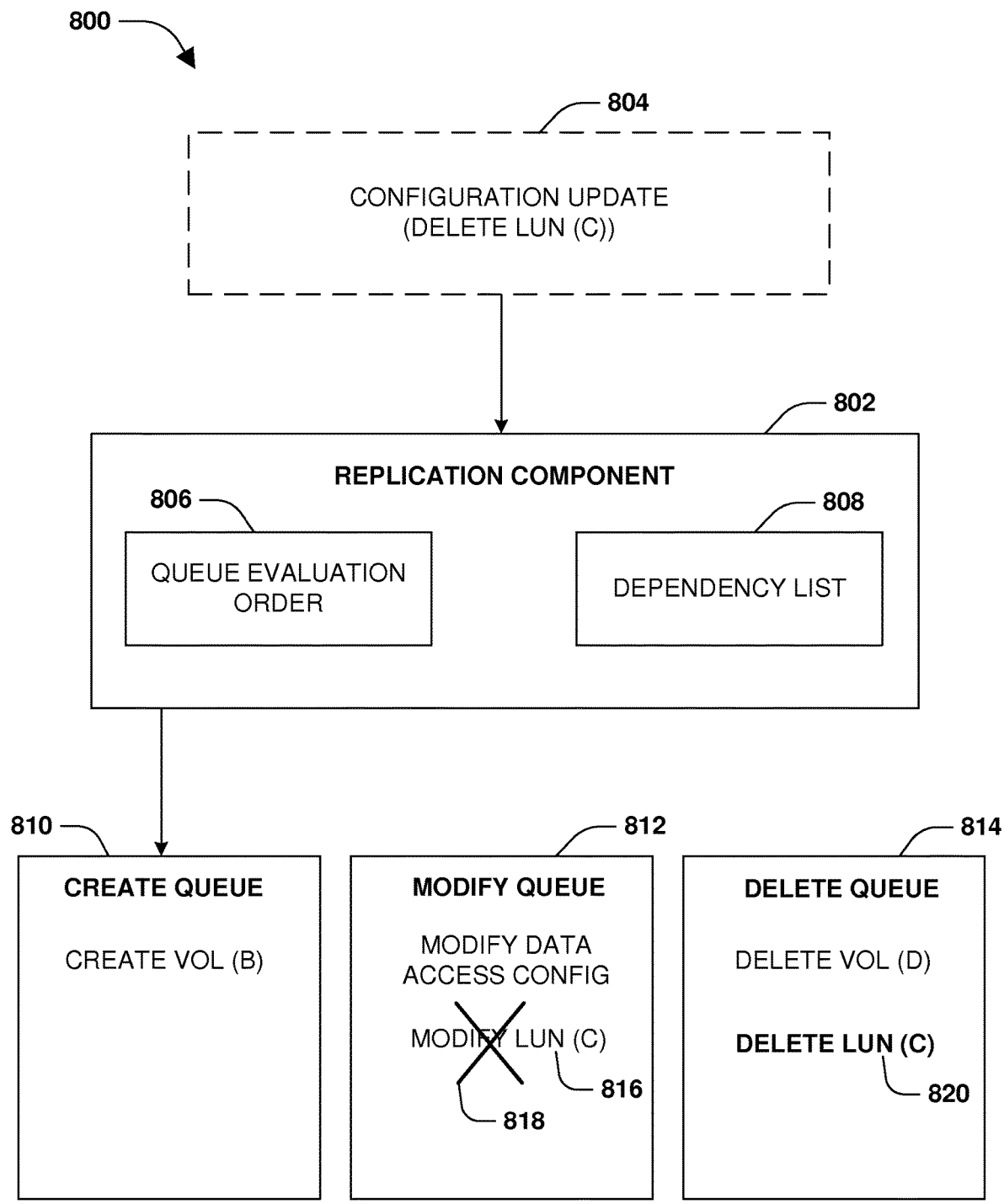
FIG. 8B is a component block diagram illustrating an exemplary system for managing configuration updates used to replicate configuration of a primary storage virtual machine to a partner storage virtual machine, where a consolidation rule is implemented.

FIGS. 8A-8B illustrate examples of a system 800, comprising a replication component 802, for managing configuration updates used to replicate configuration of a primary storage virtual machine to a partner storage virtual machine. The replication component 802 may maintain a create queue 810, a modify queue 812, and a delete queue 814. In an example, a create volume (B) queued configuration update may be queued within the create queue 810, a modify data access configuration queued configuration update and a modify LUN (C) queued configuration update 816 may be queued within the modify queue 812, and a delete volume (D) queued configuration update may be queued within the delete queue 814. The replication component 802 may sort queued configuration updates within the queues based upon a dependency list 808 of dependencies between objects. The replication component 802 may maintain a queue evaluation order 806 specifying that the create queue 810 should be evaluated first, the modify queue 812 should be evaluated after the create queue 810, and the delete queue 814 should be evaluated after the modify queue 812 for object identification.

FIG. 8A illustrates the replication component 802 receiving a configuration update 804 from the primary storage virtual machine. The replication component 802 may evaluate the configuration update 804 to determine that the configuration update 804 corresponds to a delete object command used to delete a LUN (C) object. The replication component 802 may evaluate the create queue 810, the modify queue 812, and/or the delete queue 814 (e.g., according to the queue evaluation order 806) to determine whether a queued configuration update, associated with the LUN (C) object, exists within a queue. For example, the replication component 802 may determine that the modify LUN (C) queued configuration update 816, within the modify queue 812, corresponds to the LUN (C) object. FIG. 8B illustrates the replication component 802 implementing a consolidation rule based upon the modify queue 812 comprising the modify LUN (C) queued configuration update 816 corresponding to the LUN (C) object. The consolidation rule may specify that the modify LUN (C) queued configuration update 816 is to be removed 818 from the modify queue 812 and that the configuration update 804 is to be queued within the delete queue 814 as a delete LUN (C) queued configuration update 820, which may achieve a similar result using a single queued configuration update as if both the modify LUN (C) queued configuration update 816 and the configuration update 804 were performed.

Figure 9A:
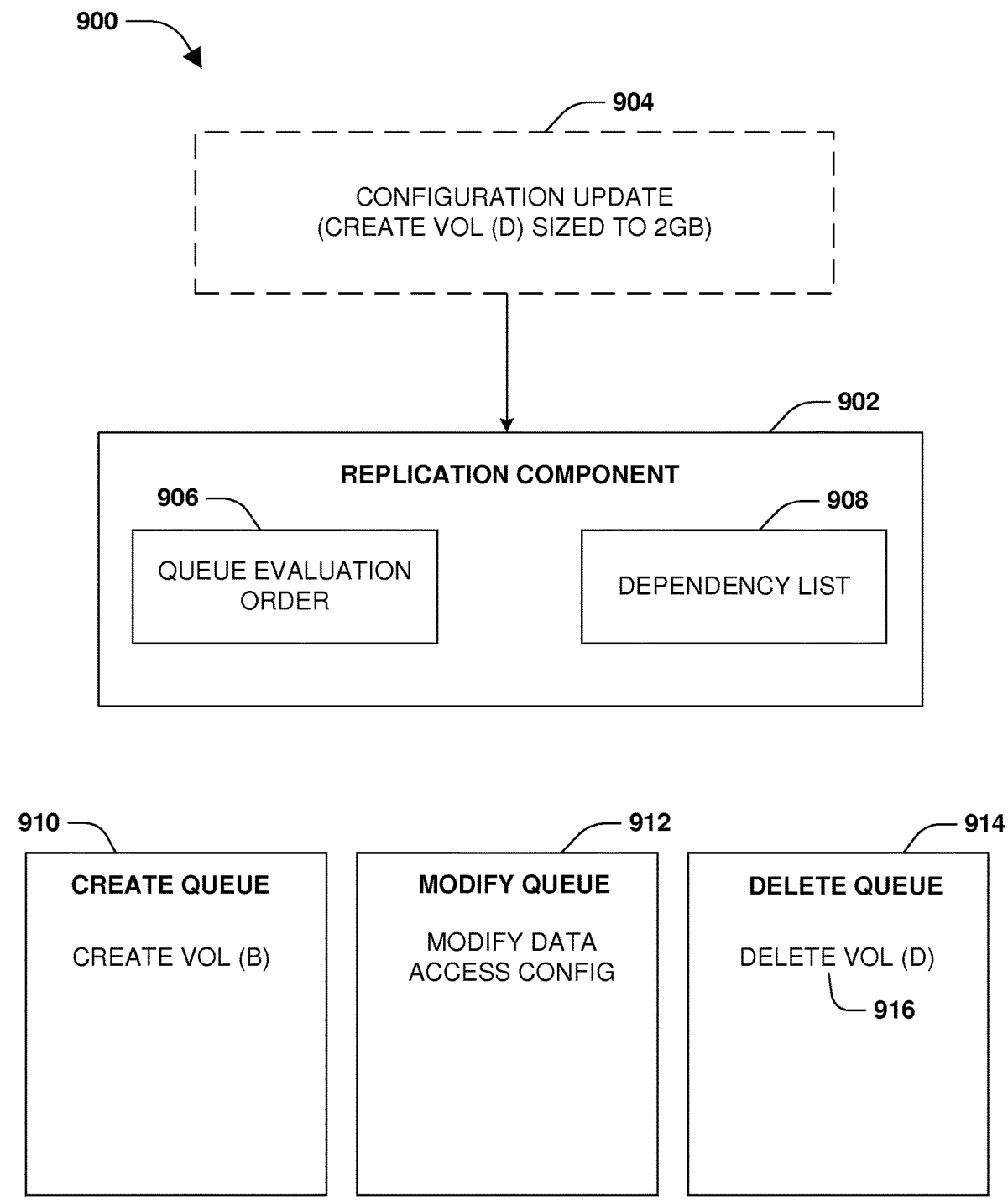
FIG. 9A is a component block diagram illustrating an exemplary system for managing configuration updates used to replicate configuration of a primary storage virtual machine to a partner storage virtual machine, where a configuration update, corresponding to a create object command, is received.
Figure 9B:
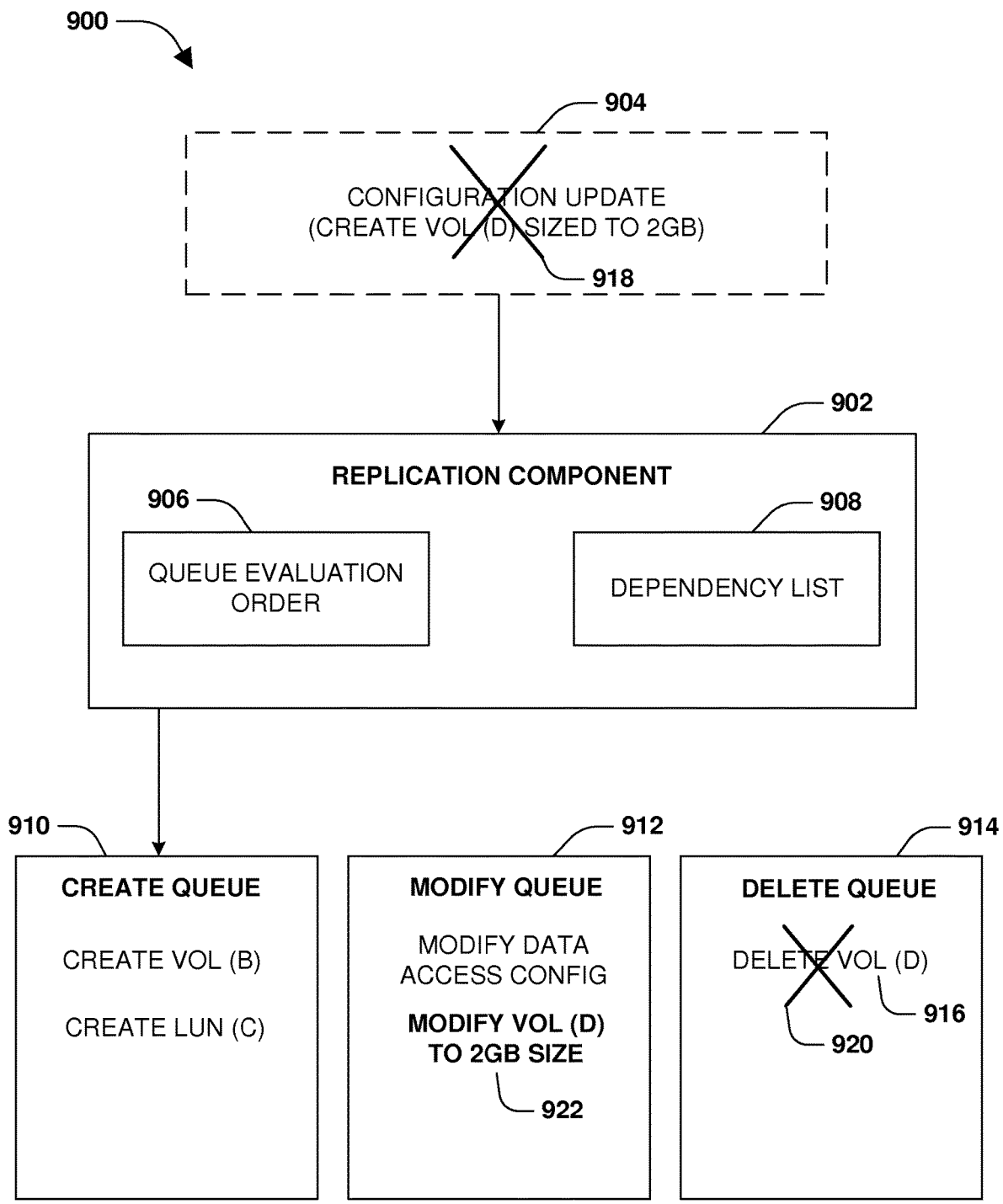
FIG. 9B is a component block diagram illustrating an exemplary system for managing configuration updates used to replicate configuration of a primary storage virtual machine to a partner storage virtual machine, where a consolidation rule is implemented.

FIGS. 9A-9B illustrate examples of a system 900, comprising a replication component 902, for managing configuration updates used to replicate configuration of a primary storage virtual machine to a partner storage virtual machine. The replication component 902 may maintain a create queue 910, a modify queue 912, and a delete queue 914. In an example, a create volume (B) queued configuration update may be queued within the create queue 910, a modify data access configuration queued configuration update may be queued within the modify queue 912, and a delete volume (D) queued configuration update 916 may be queued within the delete queue 914. The replication component 902 may sort queued configuration updates within the queues based upon a dependency list 908 of dependencies between objects. The replication component 902 may maintain a queue evaluation order 906 specifying that the create queue 910 should be evaluated first, the modify queue 912 should be evaluated after the create queue 910, and the delete queue 914 should be evaluated after the modify queue 912 for object identification.

FIG. 9A illustrates the replication component 902 receiving a configuration update 904 from the primary storage virtual machine. The replication component 902 may evaluate the configuration update 904 to determine that the configuration update 904 corresponds to a create object command used to create a volume (D) object at a size of 2 GB. The replication component 902 may evaluate the create queue 910, the modify queue 912, and/or the delete queue 914 (e.g., according to the queue evaluation order 906) to determine whether a queued configuration update, associated with the volume (D) object, exists within a queue. For example, the replication component 902 may determine that the delete volume (D) queued configuration update 916, within the delete queue 914, corresponds to the volume (D) object. FIG. 9B illustrates the replication component 902 implementing a consolidation rule based upon the delete queue 914 comprising the delete volume (D) queued configuration update 916 corresponding to the volume (D) object. The consolidation rule may specify that the delete volume (D) queued configuration update 916 is to be removed 920 from the delete queue 914, that the configuration update 904 is to be discarded 918, and that a new configuration update 922, corresponding to a modified object command having an attribute of the configuration update 904 (e.g., the modify object command may change a size of an existing volume (D) object to a 2 GB attribute of the configuration update 904), is to be queued in the modify queue 912, which may achieve a similar result using a single queued configuration update as if both the delete volume (D) queued configuration update 916 and the configuration update 904 were performed.

Figure 10:
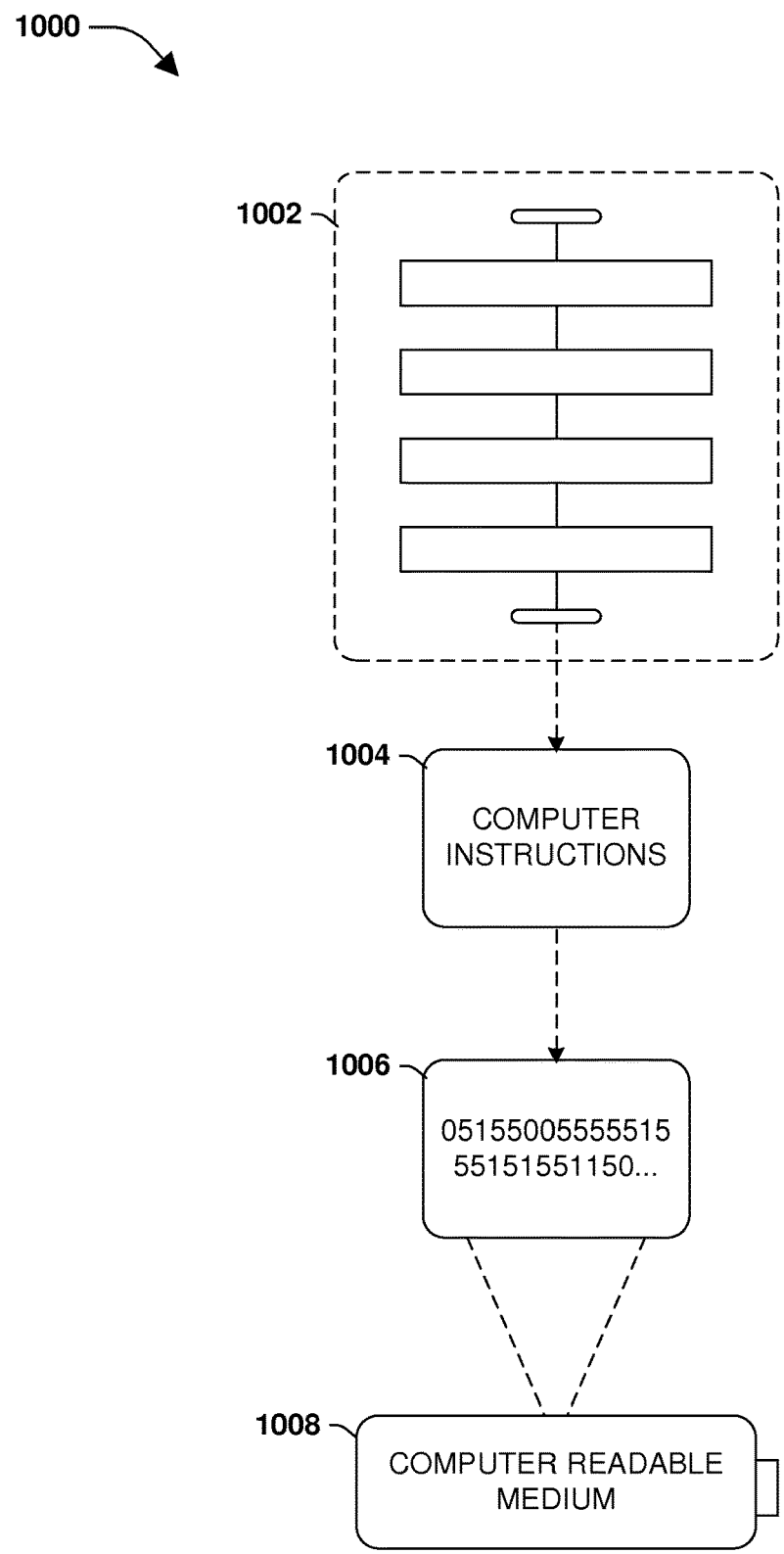
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-R, DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 400 of FIG. 4, for example. In some embodiments, the processor-executable instructions 1004 are configured to implement a system, such as at least some of the exemplary system 300 of FIG. 3, at least some of the exemplary system 500 of FIGS. 5A-5B, at least some of the exemplary system 600 of FIGS. 6A-6B, at least some of the exemplary system 700 of FIGS. 7A-7B, at least some of the exemplary system 800 of FIGS. 8A-8B, and/or at least some of the exemplary system 900 of FIGS. 9A-9B, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   evaluating, by a computing device, a plurality of queues to determine when one of the queues comprises a queued configuration update for an object to which a received configuration update is to be applied, wherein the queues are evaluated based on a queue evaluation order comprising a create queue, a modify queue, and then a delete queue;
   determining, by the computing device, a first command type of the received configuration update and a second command type of the queued configuration update when the one of the queues comprises the queued configuration update for the object to which the received configuration update is to be applied; and
   applying, by the computing device, a consolidation rule, corresponding to the first command type and the second command type, to the received configuration update and the queued configuration update.

2. The method of claim 1, wherein the first command type comprises a create object command, the second command type comprises a modify object command, and the consolidation rule specifies that the queued configuration update is to be modified based upon an attribute of the received configuration update to create a modified configuration update.

3. The method of claim 1, wherein the first command type comprises a create object command, the second command type comprises a delete object command, and the consolidation rule specifies that the queued configuration update is to be removed from the one of the queues and that the received configuration update is to be discarded.

4. The method of claim 1, wherein the first command type comprises a modify object command, the second command type comprises a delete object command, and the consolidation rule specifies that the queued configuration update is to be removed from the one of the queues and that the received configuration update is to be queued.

5. The method of claim 2, further comprising executing, by the computing device, the modified configuration update as a single command in order to implement the received configuration update and the queued configuration update.

6. The method of claim 1, comprising determining that a second object depends upon the object based dependencies between objects, applying, by the computing device, a first queued configuration update for the object before applying a second queued configuration update for the second object.

7. The method of claim 6, further comprising sorting, by the computing device, additional configuration updates within each of the queues based upon the dependency list.

8. A non-transitory machine readable medium comprising instructions for managing configuration updates comprising machine executable code which when executed by at least one machine causes the machine to:
   evaluate a plurality of queues to determine when one of the queues comprises a queued configuration update for an object to which a received configuration update is to be applied, wherein the queues are evaluated based on a queue evaluation order comprising a create queue, a modify queue, and then a delete queue;
   determine a first command type of the received configuration update and a second command type of the queued configuration update when the one of the queues comprises the queued configuration update for the object to which the received configuration update is to be applied; and
   apply a consolidation rule, corresponding to the first command type and the second command type, to the received configuration update and the queued configuration update.

9. A computing device, comprising:
   a memory containing machine readable medium comprising machine executable code having stored thereon instructions for managing configuration updates; and
   a processor coupled to the memory and configured to execute the machine executable code to cause the processor to:
      evaluate a plurality of queues to determine when one of the queues comprises a queued configuration update for an object to which a received configuration update is to be applied, wherein the queues are evaluated based on a queue evaluation order comprising a create queue, a modify queue, and then a delete queue;

determine a first command type of the received configuration update and a second command type of the queued configuration update when the one of the queues comprises the queued configuration update for the object to which the received configuration update is to be applied; and apply a consolidation rule, corresponding to the first command type and the second command type, to the received configuration update and the queued configuration update.

10. The medium as set forth in claim 8, wherein the first command type comprises a create object command, the second command type comprises a modify object command, and the consolidation rule specifies that the queued configuration update is to be modified based upon an attribute of the received configuration update to create a modified configuration update.

11. The medium as set forth in claim 10, wherein the machine executable code, when executed by the machine, further causes the machine to execute the modified configuration update as a single command in order to implement the received configuration update and the queued configuration update.

12. The medium as set forth in claim 8, wherein the machine executable code, when executed by the machine, further causes the machine to, responsive to determining that a second object depends upon the object based on dependencies between objects, apply a first queued configuration update for the object before applying a second queued configuration update for the second object.

13. The medium as set forth in claim 12, wherein the machine executable code, when executed by the machine, further causes the machine to sort additional configuration updates within each of the queues based upon the dependency list.

14. The computing device as set forth in claim 9, wherein the first command type comprises a create object command, the second command type comprises a modify object command, and the consolidation rule specifies that the queued configuration update is to be modified based upon an attribute of the received configuration update to create a modified configuration update.

15. The computing device as set forth in claim 14, wherein the processor is further configured to execute the machine executable code to further cause the processor to execute the modified configuration update as a single command in order to implement the received configuration update and the queued configuration update.

16. The computing device as set forth in claim 9, wherein the processor is further configured to execute the machine executable code to further cause the processor to, responsive to determining that a second object depends upon the object based on dependencies between objects, apply a first queued configuration update for the object before applying a second queued configuration update for the second object.

17. The computing device as set forth in claim 16, wherein the processor is further configured to execute the machine executable code to further cause the processor to sort additional configuration updates within each of the queues based upon the dependency list.

* * * * *